United States Patent
Ishikawa et al.

[11] Patent Number: 6,158,474
[45] Date of Patent: Dec. 12, 2000

[54] RUST-RESISTANT SLEEVE FOR USE IN A BRANCH HOLE OF A WATER PIPELINE

[75] Inventors: Kazuo Ishikawa; Yasushige Otani, both of Osaka, Japan

[73] Assignee: Tabuchi Co., Ltd., Japan

[21] Appl. No.: 09/247,481

[22] Filed: Feb. 8, 1999

[30] Foreign Application Priority Data

Sep. 29, 1998 [JP] Japan ................................. 10-292915
Feb. 3, 1999 [JP] Japan ................................. 11-026433

[51] Int. Cl.$^7$ ..................................................... F16L 9/02
[52] U.S. Cl. ........................... 138/109; 138/143; 138/146; 285/55; 285/925
[58] Field of Search ................................. 138/110, 109, 138/98, 146, 143; 285/55, 197, 198, 199, 422, 382.5, 906, 925; 277/934

[56] References Cited

U.S. PATENT DOCUMENTS

| | | | |
|---|---|---|---|
| 2,445,273 | 7/1948 | Kennedy | 285/925 |
| 2,449,616 | 9/1948 | Pennella | 285/925 |
| 3,951,438 | 4/1976 | Scales | 285/55 |
| 4,443,019 | 4/1984 | Ishido et al. | 277/227 |
| 4,558,875 | 12/1985 | Yamaji et al. | 277/227 |
| 4,590,227 | 5/1986 | Nakamura et al. | 523/130 |
| 4,613,171 | 9/1986 | Corcoran | 285/197 |
| 4,708,351 | 11/1987 | Midooka et al. | 277/184 |
| 5,011,875 | 4/1991 | Yamamoto et al. | 524/45 |
| 5,290,844 | 3/1994 | Otsuka | 524/426 |
| 5,738,146 | 4/1998 | Abe | 138/120 |
| 5,817,713 | 10/1998 | Pappas et al. | 524/521 |
| 5,971,441 | 10/1999 | Ishikawa et al. | 285/55 |

FOREIGN PATENT DOCUMENTS

| | | |
|---|---|---|
| 814480 | 1/1996 | Japan . |
| 2554797 | 8/1997 | Japan . |

*Primary Examiner*—James Hook
*Attorney, Agent, or Firm*—Thompson Hine & Flory LLP

[57] ABSTRACT

A reliable sleeve unit with a water-absorbing swelling rubber that provides a reliable seal to a branch hole and the branch stop while controlling the development of rust. The rubber layer is applied on a cylindrical metal sleeve having a flange on its outer circumference in a manner such that a certain height length of the metal sleeve from its bottom end face is left uncovered. The height length of the flange is set to be long enough for the flange to be inserted into the inner circumference of the branch pipe to be connected to the branch hole. The rubber layer is applied onto the metal sleeve in a manner such that the height length of the rubber layer coating the metal sleeve is approximately equal to the wall height of the branch hole, or in a manner such that the bottom edge of the rubber layer is set to be higher than the bottom end face of the metal sleeve.

6 Claims, 2 Drawing Sheets

RUST-RESISTANT SLEEVE FOR USE IN A BRANCH HOLE OF A WATER PIPELINE

BACKGROUND OF THE INVENTION

1. Field of the Invention

The present invention chiefly relates to improvements in a rust-resistant sleeve that prevents rust and corrosion from developing around the wall of a branch hole when the sleeve is rigidly fitted into the branch hole that is drilled through the wall of a metal conduit such as a water pipeline.

2. Description of the Related Art

A rust-resistant sleeve is known and in widely use in water supply systems. Such a rust-resistant sleeve is fitted into a branch hole drilled into the wall of a water pipeline to attain rust and corrosion resistance in the inner surface of the pipeline.

Many of these rust-resistant sleeves are metal sleeves made of copper (phosphor-deoxidized copper), stainless steel or the like, and are directly fitted into a branch hole drilled into the wall of a water pipeline. When the sleeve is installed into the pipeline, undue force works on the sleeve, causing it to be frequently deformed. Such a deformation creates an insufficient contact between the inner wall of the branch hole and the metal sleeve, thereby causing the sleeve to fail to achieve a good rust resistance performance. A technique for increasing rust and corrosion resistance has been developed (Japanese Patent Laid Open Gazette No. 3-96794), in which the outer circumference of the metal sleeve is coated with a water-absorbing swelling rubber.

This technique is intended to fill and seal a void with an expansion of the water-absorbing swelling rubber even if the void takes place in the inner lining of the water pipeline. A sufficient volume of water-absorbing swelling rubber is provided on the lower portion of the metal sleeve. The expansion coefficient of the water-absorbing swelling rubber is generally very large. The water-absorbing swelling rubber expands 20 times larger than its original size in its dry state to the extent that an expanded rubber portion projects out of the sleeve bottom surface. The projecting portion of the rubber may be sometimes torn by a water stream during a long-time service, and may be introduced into the stream of water. A branch pipe is connected to the branch hole, typically with a saddle-type branch stop installed therebetween. A poor connection structure between these components becomes a cause of water leakage and rust. The above-described conventional art offers no steps to assure rust resistance and corrosion resistance.

The portion of the metallic sleeve supporting the flange is made thinner than the remaining portion of the metallic sleeve. When the rust-resistant sleeve is under a longitudinal pressure, the thinner portion first buckles, thereby causing the outer diameter of the flange to increase. Two annular ring portions radially outwardly projecting at both ends of the thinner portion of the metallic sleeve cause the thinner portion to easily buckle.

SUMMARY OF THE INVENTION

Accordingly, it is an object of the present invention to provide a reliable sleeve which, though employing a water-absorbing swelling rubber as in the conventional art, provides a firm seal on a branch hole, a branch stop and its surrounding area while controlling the development of rust.

To achieve the above object, the lower portion of the outer circumference of a cylindrical metal sleeve with a flange arranged thereon is coated with a water-absorbing swelling rubber layer, except a bottom end portion. The water-absorbing swelling rubber has the property that it expands its volume when the rubber absorbs water, and some of synthetic rubbers and plastic rubbers have this property. The water-absorbing swelling rubber starts expanding when the water runs through the pipeline, and reaches to its maximum expansion within a predetermined time. A sufficient seal is provided if the gap between the sleeve and the branch hole is set to be smaller than the maximum volume of the water-absorbing swelling rubber layer at its expanded state. Since the area where the water-absorbing swelling rubber layer is applied is limited to the outer circumference, except the bottom end portion, a lip-like projection out of the bottom end of the sleeve is controlled even if the rubber is expanded to its maximum volume.

The height length of the flange is set so that the flange is inserted into the inner circumference of the branch pipe which is connected to the branch hole. Rust resistance in the connection area of the branch stop is thus assured.

The height length of the water-absorbing swelling rubber along the metal sleeve is set to be approximately equal to the wall height of the branch hole, or the bottom edge of the water-absorbing swelling rubber is slightly higher than the bottom end face of the metal sleeve leaving the bottom end portion of the sleeve uncovered so that no extra rubber portion is torn subsequent to expansion. The wall height of the branch hole refers to the overall thickness of the pipeline including not only the thickness of the pipeline but also the thickness of the lining of the pipeline.

DESCRIPTION OF THE PREFERRED EMBODIMENT

Figure 1:
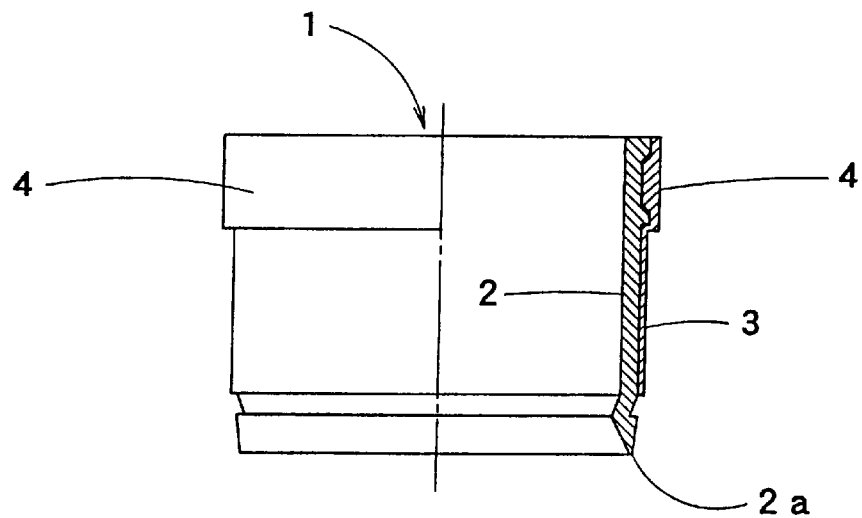
FIG. 1 shows one example of a rust-resistant sleeve unit of the present invention, with its half shown in section.

Referring now to the drawings, the embodiment of the present invention are discussed. FIG. 1 shows a rust-resistant sleeve unit 1 with its half shown in section. Designated 2 is a hollow cylindrical sleeve made of a rust-free metal such as phosphor-deoxidized copper or stainless steel. A water-absorbing swelling rubber layer 3 is formed around the sleeve 2, and the upper portion of the water-absorbing swelling rubber layer 3a forms a flange 4. The sleeve 2 has two annular ring projections that help the rubber layer 3 secure hold on the sleeve 2. The bottom edge of the rubber layer 3 is set to be higher than the bottom end face 2a of the sleeve 2 so that the bottom end portion of the sleeve 2 is left exposed. When the rust-resistant sleeve unit is installed, the flange 4 is positioned outside the water pipeline, and the rubber layer 3, except the flange 4, is in contact with the inner wall of the branch hole.

Figure 2:
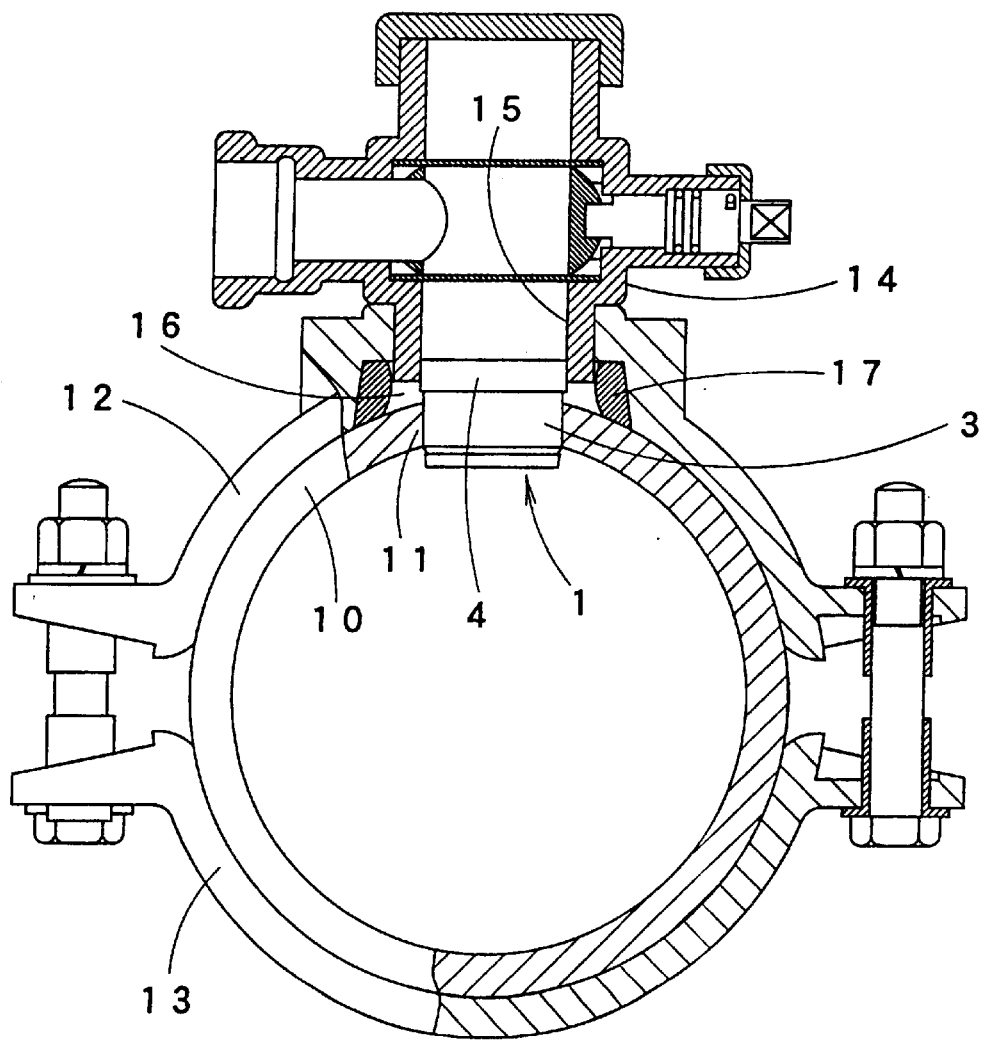
FIG. 2 is a sectional view of a major portion of the rust-resistant sleeve mounted on a saddle-type branch stop.

FIG. 2 shows the rust-resistant sleeve unit 1, shown in FIG. 1, mounted on a saddle-type branch stop. A piping structure includes a water pipeline 10, a branch hole 11 drilled in the pipeline 10, an upper saddle 12, a lower saddle 13, and a branch stop 14 screwed into the upper saddle 12. The basic structure of the pipeline 10, the saddle and the branch stop 14 is a known one. For rust resistance, a lining is provided in the inner circumference of the pipeline 10, but for simplicity, the pipeline 10 is shown as including the lining in FIG. 2.

The important technique in this embodiment is that the flange 4 is inserted into the inner circumference of a branch pipe 15, from its bottom end upward, forming part of the branch stop 14. With this arrangement, the rubber layer 3 including the flange expands its volume in response to a stream of water, providing a sufficient seal with the inner circumference of the branch pipe 15. If the seal here is not sufficient, leakage water leads to the spacing 16 formed by the saddle 12 and the pipeline 10, causing rust to develop. A gasket 17, installed in the spacing 16, prevents water from leaking into between the pipeline 10 and the saddle 12, initially, at least until the rubber layer 3 fully expands. Since a full seal is achieved subsequent to the water running in this embodiment, the only cause of rust in the spacing 16 is residual oxygen. The development of rust is thus substantially controlled. The height length of the flange 4 is properly set in accordance with the standard of the saddle-type branch stop. It is required that the flange 4 be inserted into the branch pipe 15 to the extent that a sufficient seal is attained when the rust-resistant sleeve unit 1 is mounted on the branch hole 11 and the branch stop 14 is installed on the pipeline. The height length of the flange 4 is determined to satisfy the above requirement.

Another important technique in the rust-resistant sleeve unit 1 is that the bottom edge of the rubber layer 3 is higher than the bottom end face of the sleeve 2. Preferably, the bottom edge of the rubber layer 3 is set such that the rubber layer 3 attains a reliable seal with the inner wall of the branch hole 11 when the rubber layer 3 expands. In this embodiment, it is required that the rubber layer 3 provide seal with the branch pipe 15 on its flange 4 and provide seal with the branch hole 11 on its remaining portion. The present invention employs a water-absorbing swelling rubber 3 having an expansion coefficient of 20 times. If the rubber layer 3 extends downward to cover the sleeve 2 down to its bottom end, the rubber layer 3 expands in excess of the bottom end and projects downward in a liplike shape when water is run. Such an extra lip-like portion is unwanted and may be torn apart by the stream of water and mixed into the stream of water. The sleeve 2 is coated with the rubber layer 3 in a sufficient but not excess coverage as described above to prevent such a problem.

No specific dimensional guidance is set about how much to cut the rubber layer 3 from the sleeve 2 from its bottom end, but it is required that no lip extending over the bottom end of the sleeve 2 be generated at the maximum expanded state of the rubber layer 3 and that the rubber layer 3 provide a seal covering the inner wall of the branch hole 11 at its expanded state. The rubber layer 3 is adjusted to its adequate height length keeping the above requirement satisfied. The length of the rubber layer 3 may be set so that its bottom edge projects out into the inside of the pipeline with the rust-resistant sleeve unit 1 mounted, but the length of the rubber layer 3 may be also set so that the bottom edge may not reach the inside of the pipeline. Particularly, for its water-absorbing swelling property, the rubber layer 3 completes its expansion process within a few hours after a water feeding, and the direction of expansion is inward along the branch hole into the inside of the pipeline. As a result, the rubber layer 3 reaches in the inside of the pipeline, thereby achieving a sufficient seal.

The rust-resistant sleeve unit is easily mounted by a stretcher that is a tool used for mounting the conventional sleeve.

The water-absorbing swelling rubber 3 is arranged so that its volume expansion due to water absorption is used on the circumference of the rust-resistant unit 1. The water-absorbing swelling rubber 3 is produced by mixing SBR (styrene-butadiene rubber) or EPDM (ethylene-propylene-dienemetylene linkage) rubber with a water-absorbing swelling material such as a water-absorbing polymer.

Figure 3:
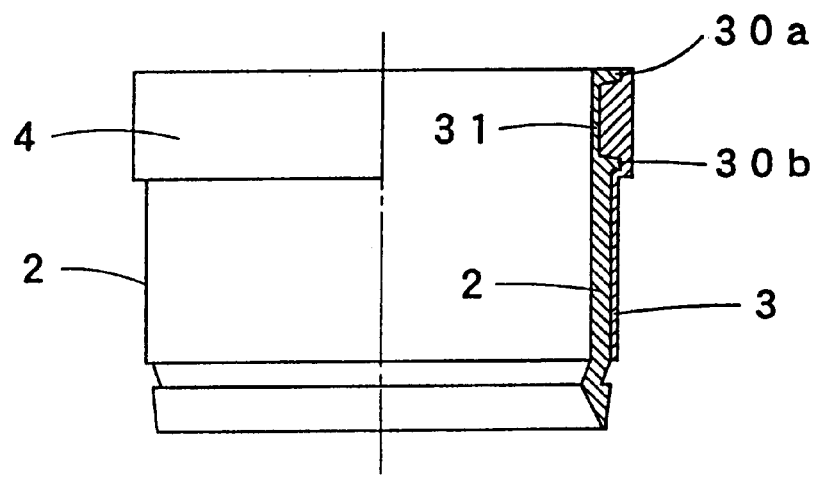
FIG. 3 shows another example of a rust-resistant sleeve unit of the present invention, with its half shown in section.
Figure 4:
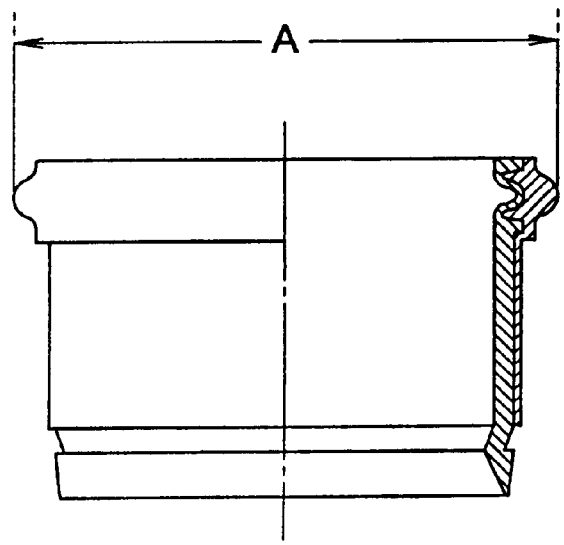
FIG. 4 shows the rust-resistant sleeve unit in its buckled state, with its half shown in section.

FIG. 3 shows another embodiment of the rust-resistant sleeve unit shown in FIG. 1. Although this embodiment also uses the water-absorbing swelling rubber layer 3 like the first embodiment, the portion of the metallic sleeve 2 supporting the flange is modified. Specifically, the thickness 31 of the metallic sleeve between two outwardly projecting annular rings 30a and 30b is made thinner, thereby causing the rubber layer 3 to be accordingly thicker. When the sleeve unit is mounted, a vertical force is applied with a core inserted into the sleeve unit, a preferable bucking takes place because the metal sleeve having the thickness 31 is mechanically weaker than the remaining portion. Since the core is inserted into the sleeve unit, the buckling takes place in a radially external direction rather than in a radially internal direction as shown in FIG. 4. The outer diameter A of the rubber layer is enlarged than the original diameter prior to the development of the buckling.

The resulting structure advantageously works, for example, if there is a gap of several millimeters between the inner diameter of the branch tube 15 and the outer diameter of the flange 4 as shown in FIG. 2. Although the water-absorbing swelling rubber for the rubber layer 3 expands at a large expansion coefficient with time elapse under wet environments, a relatively long time is required to assure reliable seal if the gap is wide. In this embodiment, the flange 4 is ntentionally buckled to fill partly or entirely the gap, and the time required to assure the seal is substantially reduced. Buckling the metallic sleeve to its maximum is not a requirement, and buckling the metallic sleeve to the extent that the gap is filled is sufficient enough. In succession, the expansion of the water-absorbing swelling rubber then achieves a reliable seal.

The sleeve is buckled in a step for mounting the rust-resistant sleeve unit shown in the embodiment in FIG. 1 rather than in a separate step. Specifically, to mount the rust-resistant sleeve unit, the separate core is used to control the buckling. The core is inserted into the rust-resistant sleeve unit mounted on the pipeline 10, and the inwardly projecting flange of the core (for pushing the rust-resistant sleeve) buckles the metallic sleeve having the thickness 31. The buckled state is thus easily produced.

The rust-resistant sleeve unit of the present invention, when installed in the branch hole of the saddle-type branch stop typically used as a branch stop, reliably provides a seal on the branch stop and the branch hole, thereby preventing the development of rust and corrosion there. Since the water-absorbing swelling rubber, as a sealing material, is applied around the circumference of the sleeve in the form of the cover and the flange, the size of the rubber layer is small at its non-expanded state, and an operation of inserting the sleeve into the branch hole is easy. The flange of the sleeve unit is easily inserted into the branch pipe of the branch stop. The installation of the sleeve unit of the present invention is easy and reliable, compared with the conventional structure in which an O-ring is used as a seal.

The height of the flange is set to a proper length to be inserted into the inner circumference of the branch pipe to be connected with the branch hole. With this arrangement, no extra seal is required to connect the branch pipe of the branch stop to the branch hole, and a water leakage from the branch pipe is thus precluded. The height length of the water-absorbing swelling rubber layer is substantially equal to the wall height of the branch hole or the bottom edge of the rubber layer is set to be higher than the bottom end face of the sleeve. With this arrangement, no lip projects from the sleeve at the expanded state of the rubber layer, and thereby no lip is torn apart from the rubber layer.

Making the portion of the metallic sleeve supporting the flange thinner than the remaining portion of the metallic sleeve allows the metallic sleeve to easily buckle. Even when the present invention is applied to the piping with the gap between the branch pipe and the flange of the rust-resistant sleeve, the buckling enlarges the outer diameter of the flange, thereby achieving the seal quickly. With the annular rings radially outwardly projecting on both sides of the thinner portion, the development of the buckling is controlled to within this area, and a reliable installation is thus assured.

What is claimed is:

1. A rust-resistant sleeve unit for use in a branch hole, comprising a cylindrical metal sleeve and a water-absorbing swelling rubber layer coating the outer circumference of the metal sleeve except for a bottom end face of the metal sleeve, said water-absorbing swelling layer forming a flange on the circumference of an upper portion of said sleeve.

2. A rust-resistant sleeve unit according to claim 1, wherein the flange is sufficiently long axially such that when the sleeve unit is mounted on the branch hole and the flange is inserted into a branch pipe to be connected to the branch hole and the flange is water swelled in response to water, said flange water swells to form a seal with the inner circumference of said branch pipe.

3. A rust-resistant sleeve unit according to claim 1, wherein the sleeve unit is mounted on a walled branch hole and the axial length of the water-absorbing swelling rubber layer coating the metal sleeve is approximately equal to the wall thickness of the branch hole.

4. A rust-resistant sleeve unit according to claim 1, wherein the water-absorbing swelling rubber layer coats the metal sleeve thereby forming a bottom edge of the rubber layer on a lower portion of said sleeve, said bottom edge being axially distal from the bottom end face of the metal sleeve.

5. A rust-resistant sleeve unit according to claim 1, wherein said upper portion of said sleeve has two radially projecting annular rings which support said flange.

6. A rust-resistant sleeve unit according to claim 5, wherein said radially projecting rings define a thinner flexible section of said sleeve therebetween, said flexible section of said sleeve being thinner than said lower portion of said sleeve.

* * * * *